(12) United States Patent
Baudat et al.

(10) Patent No.: US 8,561,777 B2
(45) Date of Patent: Oct. 22, 2013

(54) COIN SENSOR

(75) Inventors: Gaston Baudat, Glenmoore, PA (US); David Michael Furneaux, Reading (GB)

(73) Assignee: MEI, Inc., Malvern, PA (US)

( * ) Notice: Subject to any disclaimer, the term of this patent is extended or adjusted under 35 U.S.C. 154(b) by 0 days.

(21) Appl. No.: 11/877,437

(22) Filed: Oct. 23, 2007

(65) Prior Publication Data

US 2009/0101469 A1    Apr. 23, 2009

(51) Int. Cl.
  *G07F 9/08*     (2006.01)
  *G06F 7/00*     (2006.01)
  *G06F 9/00*     (2006.01)
  *G06F 19/00*    (2011.01)

(52) U.S. Cl.
  USPC ............................ 194/317; 194/318; 194/320

(58) Field of Classification Search
  USPC ........ 194/317–320; 73/514, 514.14; 324/657, 324/662
  See application file for complete search history.

(56) References Cited

U.S. PATENT DOCUMENTS

| | | | | |
|---|---|---|---|---|
| 3,576,244 A * | 4/1971 | Ptacek et al. | ................... | 194/318 |
| 4,254,857 A * | 3/1981 | Levasseur et al. | ............ | 194/319 |
| 4,717,006 A | 1/1988 | Chapman et al. | | |
| 5,017,888 A * | 5/1991 | Meinzer | ........................ | 330/295 |
| 5,078,252 A | 1/1992 | Furuya et al. | | |
| 5,458,225 A * | 10/1995 | Iwamoto et al. | .............. | 194/318 |
| 5,573,099 A * | 11/1996 | Church et al. | ................. | 194/317 |
| 6,068,102 A | 5/2000 | Kawase | | |
| 6,325,197 B1 * | 12/2001 | Furuya | .......................... | 194/318 |
| 6,455,825 B1 * | 9/2002 | Bentley et al. | ................ | 219/665 |
| 6,988,606 B2 | 1/2006 | Geib et al. | | |
| 7,108,120 B2 | 9/2006 | Furuya | | |
| 8,063,777 B2 * | 11/2011 | Candy | .......................... | 340/540 |
| 2004/0015459 A1 * | 1/2004 | Jaeger | .............................. | 706/15 |
| 2004/0084278 A1 * | 5/2004 | Harris et al. | .................. | 194/302 |
| 2006/0151284 A1 * | 7/2006 | Howells | ........................ | 194/317 |
| 2007/0250559 A1 * | 10/2007 | Dhaene et al. | ................ | 708/490 |
| 2009/0315707 A1 * | 12/2009 | Candy | .......................... | 340/540 |

FOREIGN PATENT DOCUMENTS

| | | |
|---|---|---|
| EP | 0 489 041 B1 | 6/1992 |
| EP | 1 589 493 A1 | 10/2005 |
| KR | 10-2002-0022433 | 3/2002 |

* cited by examiner

*Primary Examiner* — Jeffrey Shapiro
(74) *Attorney, Agent, or Firm* — Mintz Levin Cohn Ferris Glovsky and Popeo, P.C.

(57) ABSTRACT

A coin sensor performs time-domain eddy-current testing using an inductance in one arm of a Maxwell bridge which is driven by a bipolar square wave having randomly-selected intervals between transitions, the output of the bridge being sampled at a high frequency. A processor stores a model which receives the drive signal and adjusts coefficients of the model so that the output matches the sampled measurements. Acceptance criteria are applied to the adjusted coefficients for coin classification purposes.

19 Claims, 4 Drawing Sheets

COIN SENSOR

BACKGROUND OF THE INVENTION

1. Field of the Invention

This invention relates to a coin sensor and to a method for determining the authenticity and/or denomination of a coin using a coin sensor.

2. Description of the Prior Art

It is known to make electromagnetic measurements of coins and then to process those measurements to determine whether a coin is a genuine coin belonging to a certain class or denomination. Typically, an inductance is mounted in proximity to a coin path so that the field generated by applying a drive signal to the inductance is influenced by the coin as it passes.

It is known to drive the coil using a drive signal which contains a broad spectrum of frequencies, e.g. by applying a square wave drive signal containing multiple harmonics. The influence of the coin on the field is then sampled at successive time instants relative to the transitions in the drive signal. The samples taken at different times are predominantly influenced by material at different depths within the coin. This time-domain measuring technique can have advantages as compared to frequency-domain measurements using analog filters.

U.S. Pat. No. 4,717,006 discloses a number of time-domain eddy-current measurement arrangements. The disclosure indicates that it is possible to use, as the coin sensor, either a single coil or a pair of transmit/receive coils. When using a single coil, the output voltage across the coil is measured after the drive voltage is switched off. The output voltage will decrease at a rate dependent upon the material structure of the coin. In a transmit/receive coil arrangement the coin passes in proximity to both coils, the drive signal is applied to the transmit coil, and the effects of the coin are determined by measuring the output of the receive coil.

The disclosed arrangements are unsuitable for extracting detailed measurement information relating to coins with thin plating, such as plated steel coins. In order to perform measurements which are indicative of the very thin plating material, it is necessary to take samples very close to (soon before or after) a voltage transition in the drive signal. Preferably, the measurement should include measurements taken at around two, four and eight microseconds before or after a transition. However, the disclosed circuits would not be able to achieve accurate measurements at these timings. In the single coil arrangement, if the resistance across the inductance is low, it would take a significant amount of time to discharge the energy in the coil after a transition, resulting in "ringing", which would mask the effects of the decaying eddy currents in the coil. On the other hand, if the resistance is large, the current flow caused by the decaying eddy currents would be very small and difficult to measure. In a transmit/receive coil arrangement, the mutual inductance between the coils would mask the effects of the eddy currents in the coin.

It would be possible to use shielded, concentric coils (e.g. as shown in EP-A-489041 and EP-A-1589493) to mitigate this problem. However, this is an expensive solution which does not completely solve the problem.

It would therefore be desirable to provide an improved arrangement for time-domain eddy-current measurements of a coin which permits the taking of measurements predominantly influenced by a very thin surface layer of the coin.

It would also be desirable to extract a large number of measurements of the coin, giving very detailed information about the coin under test, and to process these measurements in order to obtain better discrimination. However, the prior art techniques for processing measurements are limited and not readily suited for use with large numbers of measurements. It would be particularly desirable to develop such a processing procedure which would be suitable for use not only with time-domain eddy-current measurements, but also with other types of measurements.

SUMMARY OF THE INVENTION

Aspects of the present invention are set out in the accompanying claims.

The invention provides two separate solutions to the problems set out above, one relating to the hardware structure of a coin sensor for time-domain eddy-current measurements and the other relating to an improved method of processing such measurements, or different types of measurements, of a coin. Although these solutions can be used independently, there are particular advantages using them in combination.

According to a further aspect of the present invention, a coin sensor is arranged to perform time-domain eddy-current measurements using an inductance, wherein the inductance forms one arm of an AC bridge. An AC bridge divides the current generated by a drive signal into two paths, each comprising two arms connected in series, the output of the bridge being taken from the junction between the arms in the first path and the junction between the arms in the second path. When in balance, the two paths have matching AC characteristics and the output is zero. The AC characteristics of only one of the paths, containing the inductance, are changed when a coin is close to the inductance. Preferably, the bridge is substantially in balance when no coin is in proximity to the inductance. Accordingly, the output signal of the bridge changes from substantially zero to a value dependent upon the coin characteristics. This proportionately very large change facilitates the detection of the effects of small eddy-currents, while the impedance characteristics of the bridge prevent "ringing" of the inductance.

The bridge is preferably a Maxwell bridge, with the AC characteristics in the path containing the inductance being matched by virtue of the presence of a capacitor in the other path.

Although bridge circuits have been used in the past in coin sensors (e.g. in U.S. Pat. No. 4,513,762) these have generally been operated with single-frequency drive signals and tuned so that the presence of coins of a specific denomination causes null values to appear across the bridge. Such arrangements would not be suitable for use with broadband signals as used in the present invention.

According to a still further aspect of the invention, coin testing is carried out by using a coin sensor to derive multiple measurements of a coin, and then deriving the coefficients of a model of the transfer function of the coin and the sensor. For example, the coefficients can be derived using known mathematical techniques and algorithms, such as iterative or estimation techniques, using input and output samples and the model. Similarly, the coefficients for a given model can be derived by adjusting the coefficients of the model so that it models the transfer function of the coin and the sensor, as indicated by the model output corresponding to the measurement samples. Acceptance criteria are then applied using the coefficients, for example, by applying acceptance criteria to the coefficients, or data derived from the coefficients, to determine the class or denomination of the coin. Preferably, a drive signal which is used to drive the coin sensor is also applied to the model. This could be avoided if the drive signal is known, because the drive signal parameters may then form part of the model. However, in the preferred embodiment, the drive signal is complex and/or variable, and possibly random, and consequently the model can be made much simpler and more effective by excluding the drive signal itself, which instead is applied as an input to the model.

There may be more than one model of the coin and sensor, and the model may change or evolve with time. The coin tester may have more than one sensor. Each sensor may have a respective model or models. Alternatively, a combination of sensors may be modelled together, for example, using a multiple input multiple output (MIMO) model.

Using this technique, it is possible to process numerous measurements to obtain a very detailed analysis of the coin's effect on the sensor, while only having to process a limited number of coefficients in the classification stage.

The measurements are preferably time-domain eddy-current measurements, and are preferably derived using a sensor according to the preceding aspect of the invention.

The invention also provides an apparatus arranged to carry out the steps of the method, for example, using suitable hardware and/or software components, such as a processor.

BRIEF DESCRIPTION OF THE DRAWINGS

Arrangements embodying the present invention will now be described by way of example with reference to the accompanying drawings.

DETAILED DESCRIPTION OF THE PREFERRED EMBODIMENTS

Figure 1:
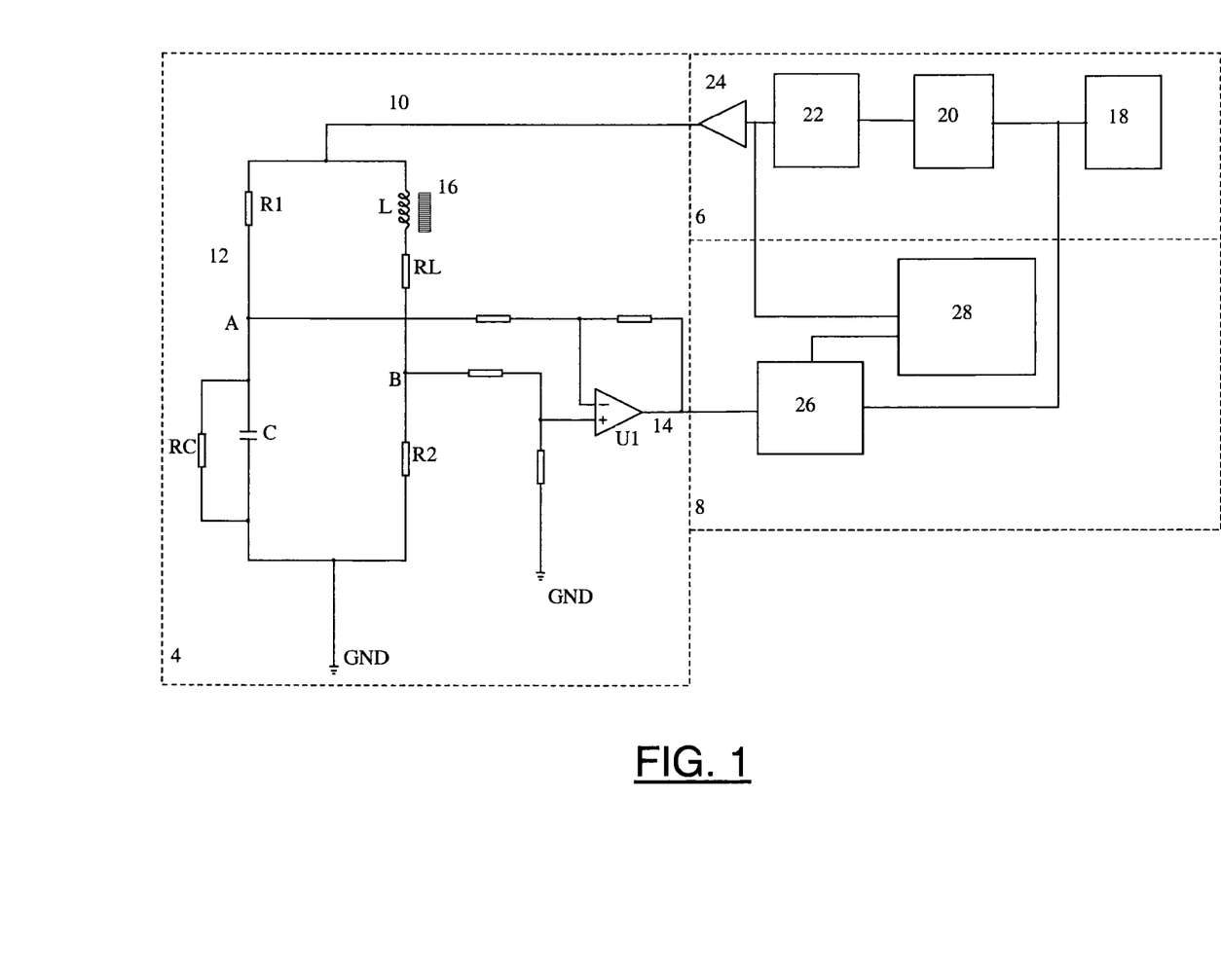
FIG. 1 is a diagram of a coin tester in accordance with the present invention.

A coin tester 2 in accordance with the present invention is shown in FIG. 1. The coin tester 2 comprises a coin sensor 4, a drive circuit 6 and a processing circuit 8.

The coin sensor 4 has an input terminal 10 and a Maxwell bridge circuit 12 connected between the input terminal 10 and ground. The bridge circuit 12 has two paths between the input terminal 10 and ground. A first path comprises a first arm including R1 connected in series with a second arm comprising a capacitor C, the parasitic resistance of which is indicated at RC.

The second path comprises a third arm including an inductance L connected in series with a fourth arm comprising a resistor R2. The inherent resistance of the coil L is indicated at RL. The output of the bridge 12 is derived from a first terminal A at the junction between resistor R1 and capacitor C in the first path, and a second terminal B between the conductor L and the resistor R2 in the second path. The signals at these points A and B are applied to a differential amplifier U1, whose output forms the output 14 of the coin sensor 4.

Assuming that the rising edge of a square wave is applied to the input terminal 10, then the voltage at point A will be an exponentially rising voltage with a time constant $$T_1 = \frac{CR_1R_C}{R_1 + R_C}.$$

The voltage at terminal B is an exponentially rising voltage with a time constant $$T_2 = \frac{L}{R_2 + R_L}.$$

A zero output 14 will be obtained when the bridge is in balance and the time constants and the DC gains are the same, which means two conditions: $LR_1^{-1}=CR_2$ and $R_CR_1^{-1}=R_2R_L^{-1}$.

The inductance L is formed of a single coil in proximity to a coin path, and produces a field which is influenced by the presence of a coin 16 travelling along the coin path. (Although it would be possible to form the inductance L of more than one coil, the combined properties of the coils would represent a single inductance in the bridge circuit 12.)

Figure 2:
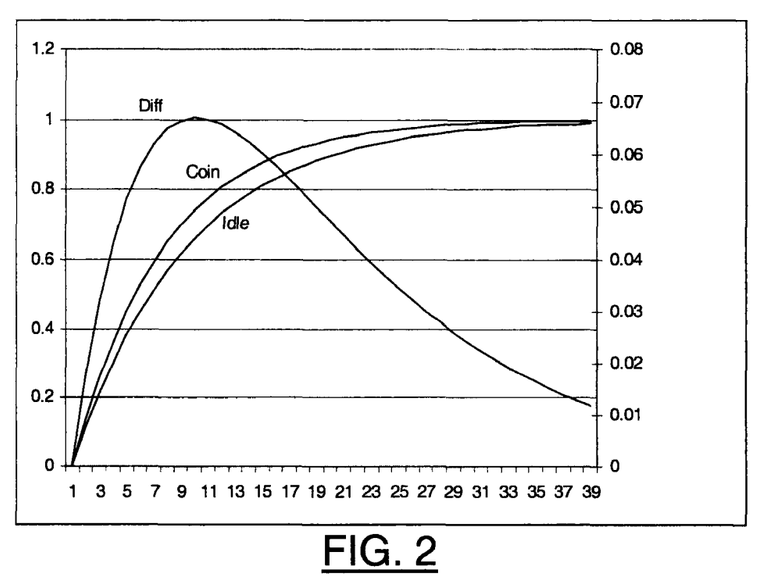
FIG. 2 is a graph showing the signals at various points in the circuit of the coin tester of FIG. 1.

Referring to FIG. 2, this a graph with a horizontal time axis showing arbitrary time units. The waveform labelled "Idle" represents the changing voltage (using the scale on the left of the graph, which is in arbitrary voltage units) of the signal at the terminal A of the bridge 12 which is obtained in response to the application of the rising edge of square wave at the input terminal 10. Assuming that no coin 16 is adjacent the inductance L, and that the bridge is in balance, then the voltage developed at the terminal B will be the same, so the output 14 will remain at zero. However, if a coin is adjacent the inductance L, then the change in voltage appearing at the terminal B will differ from the change in voltage at terminal A. The waveform labelled "Coin" in FIG. 2 represents the changing voltage at terminal B, using the left scale, when the leading edge of a square wave is applied in the presence of a coin. The changing voltage at terminal A still corresponds to the Idle curve.

It will be observed that the change in voltage from the Idle waveform to the Coin waveform is small. Although it would be possible to measure the change in the voltage appearing at terminal B directly, the signal to noise ratio would be very low due to ADC quantization. By deriving the output from the difference between the voltages at terminals A and B, it is possible to obtain an output (shown by the waveform labelled "Diff" in FIG. 2, which uses the scale at the righthand side of FIG. 2, which is in arbitrary voltage units), it is possible to obtain an output with a substantially increased signal to noise ratio.

In an alternative arrangement, the resistor R1 is replaced by an inductance and the capacitor C by a resistor. This would operate in a similar way, but is less preferred because providing a capacitor is generally less costly than providing an inductance.

The drive signal applied to input terminal 10 is obtained from a drive circuit 6. This comprises a clock generator 18 which drives, via a delay circuit 20, a random generator 22, which is preferably a pseudo-random binary sequence generator. The output of the generator 22 switches between positive and negative levels at the beginning of randomly-selected clock cycles. The output is applied to an amplifier 24, the output of which forms a drive signal applied to the coin sensor 10.

Figure 3:
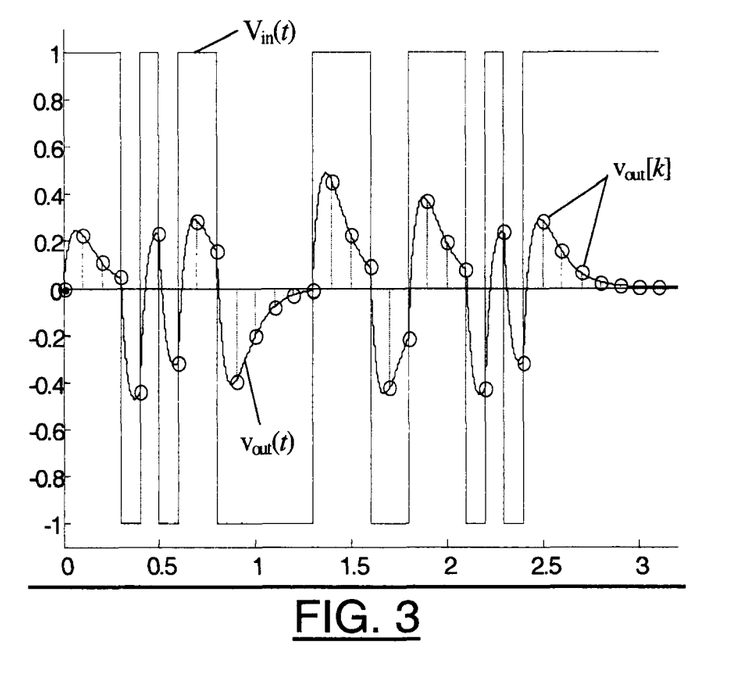
FIG. 3 is chart showing a drive signal which is applied to a coin sensor of the coin tester of FIG. 1, the analog output of the coin sensor and samples derived from the analog output.

FIG. 3 is a chart with a horizontal time axis and a vertical amplitude axis, both in arbitrary units, and shows a typical part of the drive signal, labelled "$V_{in}(t)$". This consists of constant voltages of either plus one or minus one unit and substantially instantaneous voltage transitions between the constant levels, i.e. a bipolar square wave. The minimum interval between transitions is a single clock period. The maximum interval will be determined by the random generator 22. Many suitable random generators, including pseudo-random generators and true, non-deterministic random generators, are known to those skilled in the art. (The term "random" is intended herein to include, without limitation, not only purely random, non-deterministically generated signals, but also pseudo-random and/or deterministic signals such as the output of a shift register arrangement provided with a feedback circuit as used in the prior art to generate pseudo-random binary signals, and chaotic signals.)

The analog output signal $V_{out}(t)$ provided at the terminal 14 is delivered to the processing circuit 16. The output signal is first applied to an analog-to-digital converter 26, which samples the output signal 14, each sample being taken in response to a clock pulse at the output of the clock generator 18. The delay 20 ensures that each transition in the drive signal will occur at a very short interval after a sampling time.

The output of the converter 26 is a sequence of samples shown at $V_{out}[k]$ in FIG. 3, where k is an index representing the position of the sample in the time-ordered sequence. These are delivered to a processor 28 which also receives the output of the random generator 22 (input signal).

Preferably, the input signal is also sampled. It is possible to use knowledge of the input signal in subsequent processing, but in practice the effect of the hardware could be such that sampling is desirable. Although sampling of the input signal increases the cost and processing involved, it has advantages, such as in calibration of individual coin testers.

The processor 28 stores a model which, by suitable choice of model coefficients, can represent the transfer function of the coin sensor 4 when a coin 16 of a specific denomination is located in proximity to the inductance L.

The model can be developed in a design stage using a knowledge of the physics of the coin sensor by employing any of a number of known techniques.

Examples of techniques for modelling a system are described below.

Assuming an analog system driven by a piecewise analog signal as described above, H(s) and the associated H(z) are analog and digital models describing the system. In this embodiment, the choice of a model (orders p and q) is based on an understanding of the system construction and dynamics.

A common problem is to estimate the model coefficients, or its gain, poles and zeros, from a practical experiment. This task is named the system identification.

One way to do this is to use a specific input signal, such as a pseudo-random binary sequence (PRBS) and record the associated system output. Then, for a pre-defined expected model (Z transform of the system) an identification algorithm will compute the "best" estimation.

There are many algorithms for such a task. They depend on the model structure and assumptions about the input and output noises. Relevant references include Adaptive Filter Theory, 4$^{th}$ edition, Simon Haykin; System Identification Toolbox for Use with Matlab®, The Mathworks inc. Version 5; Digital Signal Processing, a Practical Approach, Emmanuel C. Ifeachor, Barrie W. Jervis; and A Course in Digital Signal Processing, Boaz Porat. See also http://www.cheric.org/education/practical/mpc2-132-141.pdf, which includes a discussion of multiple input/multiple out (MIMO) techniques. Other references which discuss MIMO techniques include the paper "Process Control Applications of Subspace and Regression-based Identification and Monitoring Methods" by Ben C. Juricek, Dale E. Seborg and Wallace E. Larimore, and the textbook Advanced Practical Process Control By Ben H. Betlem, Brian Roffel.

A simple suitable algorithm is named ARX for Auto Regressive with eXogenous input. The identification can be done in batch mode, which means collecting all the samples from the input and output signals first and then estimating the model coefficients.

An alternate approach involves using an iterative procedure able to estimate in real time the coefficient set at each new sample pair, such as the RLS (recursive least squares) algorithm.

Another technique that is especially suitable is the use of an output error model (OE) and algorithm, such as described in "An output error model and algorithm for electromagnetic system identification" by D. M. Goodman and D. G. Dudley, Circuits Systems Signal Process Vol. 6, No. 4, 1987, pp 471-505.

Identification and adaptive filter theory are closely related since finding the right model in real time can be seen as a filtering problem.

Figure 4:
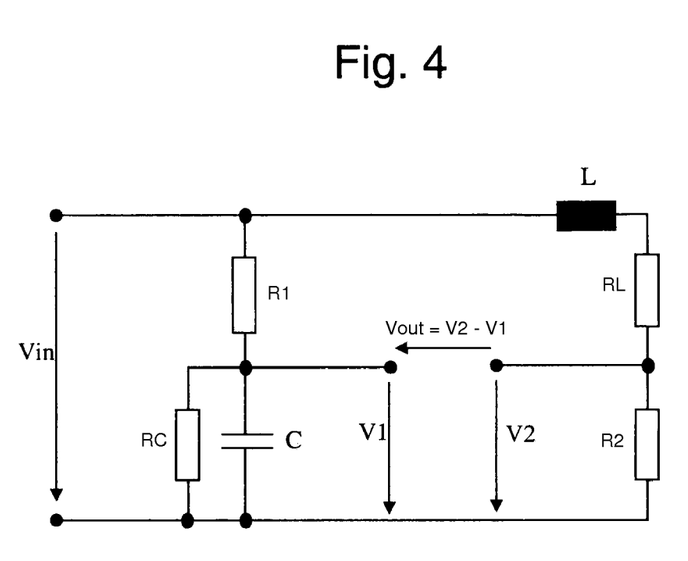
FIG. 4 is a schematic diagram of a Maxwell bridge.

For example, referring to the arrangement of FIG. 1 including the Maxwell bridge circuit 12, it can be shown that the transfer function of a Maxwell bridge, as shown schematically in FIG. 4, can be expressed as $$H_0(s) = \frac{L\{v_{out}\}}{L\{v_{in}\}} = \frac{G_{02}}{T_2}\left(\frac{1}{(s+T_2^{-1})}\right) - \frac{G_{01}}{T_1}\left(\frac{1}{(s+T_1^{-1})}\right) \quad (1)$$

With:

$$G_{01} = \frac{R_C}{R_1 + R_C}$$

the DC gain of the bridge capacitive leg (#1)

$$G_{02} = \frac{R_2}{R_2 + R_L}$$

the DC gain of the bridge inductive leg (#2)

$$T_1 = \frac{CR_1 R_C}{R_1 + R_C}$$

the total time constant of the leg #1

$$T_2 = \frac{L}{R_2 + R_L}$$

the total time constant of the leg #2

The bridge is balanced for any frequency, including 0, if the two following conditions are met.

The DC condition: $R_C R_1^{-1} = R_2 R_L^{-1}$ (voltage divider)

The AC condition: $LR_1^{-1} = CR_2$ (time constant)

Since the relation (1) is already in a simple form, we can easily express the equivalent z transform H(z).

$$H(z) = G_{02}z^{-1} - G_{02}e^{\frac{-\Delta t}{T_2}}\left(\frac{z^{-1} - z^{-2}}{1 - z^{-1}e^{\frac{-\Delta t}{T_2}}}\right) - \tag{2}$$

$$G_{01}z^{-1} + G_{01}e^{\frac{-\Delta t}{T_1}}\left(\frac{z^{-1} - z^{-2}}{1 - z^{-1}e^{\frac{-\Delta t}{T_1}}}\right)$$

$$H(z) = \frac{G_{02}\left(1 - e^{\frac{-\Delta t}{T_2}}\right)z^{-1}}{1 - z^{-1}e^{\frac{-\Delta t}{T_2}}} - \frac{G_{01}\left(1 - e^{\frac{-\Delta t}{T_1}}\right)z^{-1}}{1 - z^{-1}e^{\frac{-\Delta t}{T_1}}}$$

A more useful form is given by the next relation (3). The latter can be directly translated into a difference equation leading to a digital IIR filter (4), which assumes $v_{in}(t)$ a piecewise signal and a sampling procedure as defined in above.

$$H(z) = \frac{b_0 + b_1 z^{-1} + b_2 z^{-2}}{a_0 + a_1 z^{-1} + a_2 z^{-2}} \tag{3}$$

With:

$$a_0 = 1 \tag{4}$$
$$a_1 = -e^{\frac{-\Delta t}{T_1}} - e^{\frac{-\Delta t}{T_2}}$$
$$a_2 = e^{\frac{-\Delta t(T_1 + T_2)}{T_1 T_2}}$$
$$b_0 = 0$$
$$b_1 = G_{02}\left(1 - e^{\frac{-\Delta t}{T_2}}\right) - G_{01}\left(1 - e^{\frac{-\Delta t}{T_1}}\right)$$
$$b_2 = G_{01}\left(1 - e^{\frac{-\Delta t}{T_1}}\right)e^{\frac{-\Delta t}{T_2}} - G_{02}\left(1 - e^{\frac{-\Delta t}{T_2}}\right)e^{\frac{-\Delta t}{T_1}}$$
$$v_{out}[k] = -a_1 v_{out}[k-1] - a_2 v_{out}[k-2] + b_1 v_{in}[k-1] + b_2 v_{in}[k-2]$$

Since the analog system (Maxwell bridge) is stable and the use of the sampled impulse response (SIR) method, the filter (4) is also stable. It should be noticed that there are only 4 filter coefficients dependent on the system components. Yet we have 6 components in the bridge, which means there is an infinite amount of possibility for those leading to the same filter. To reach a one to one mapping between the filter and the analog system we need either to know some components before hand (such the leg #1), or to focus only on time constants and DC gains $T_1, T_2, G_{01}, G_{02}$, since they appear in both the analog and digital forms. This observation is especially pertinent for identification and a coin recognition point of view.

A model can then be derived, and then the model parameters are estimated from the samples of the system input and output signals.

For example, techniques involving digital parametric estimation can be used, where the parameters are co-efficients of a filter such as described in equations (3) or (4) above.

The model may be one of the class of ARMAX (Auto-Regressive Moving Average with Exogenous Input) models such as an ARX (Auto-Regressive with Exogenous Input) model which is a filter with a structure as for (3) above and which may be represented by the following time difference equation:

$$y[k] = \frac{1}{a_0}\left(\sum_{l=1}^{p} -a_l y[k-l] + \sum_{l=0}^{q} b_l x[k-l-m] + n[k]\right) \tag{5}$$

where x[k] and y[k] are the samples of the sensor input and output, respectively, n[k] represents the noise (which an be assumed to be 'white', meaning uncorrelated between any sampling times), p and q are the model orders, $a_0, a_1$ and $b_1$ are coefficients, and m is a pure delay. It is assumed that m=0 (no system delay) and $a_0=1$ (for easy notation). Therefore the ARX(p,q) model becomes:

$$y[k] = \sum_{l=1}^{p} -a_l y[k-l] + \sum_{l=0}^{q} b_l x[k-l] + n[k] \tag{6}$$

The model is then identified, using a batch, or recursive (real time), process and collected data.

In more detail, in operation of the coin tester, the random bipolar square wave drive signal is applied to the coin sensor 6 as a coin is passing the sensor. The input signals, output signals and model are processed, using known techniques as described above, to estimate the model coefficients $a_1, a_2 \ldots a_p, b_1, b_2, \ldots b_q$.

Depending on the techniques used, a small set of key coefficients, such as 10 to 20, can capture the overall system dynamic.

As a result, the processor will obtain a plurality of coefficients which will be dependent upon the properties of the coin 16 measured by the coin sensor. Acceptance criteria (which could have been derived during a previous training operation) are applied to the coefficients to determine whether the coin is a genuine coin belonging to a particular denomination. Different acceptance criteria can be used for different coin denominations. There are various well known techniques which can be used for classification on the basis of multiple parameters, such as distance (e.g. Mahalanobis distance) calculations, discriminant analysis, support vector machines, etc.

As an example, the acceptance criteria may be based on feature vectors derived from model coefficients derived using the techniques described above for known examples of given denominations of coins. Methods for deriving acceptance criteria from known examples are well-known.

In order then to test and validate and/or denominate a given coin, the above operation is carried out for the given coin, and the coefficients of the model are estimated as described above. All the coefficients, or a predetermined sub-set of coefficients, are then used to create an n-dimensional feature vector, which can then be used to validate the coin using the acceptance criteria and known classification techniques.

The following sets out optional techniques which could be used for implementing the present invention.

Preferably, measurement values are derived from the converter 26 when applying the drive signal while no coin is in proximity to the inductance L. Then, during the coin measurement stage, the output values derived from the converter 26 have subtracted from them the corresponding idle measurement values before being used for the coefficient adjustment operation. (The term "corresponding" means that the measurements are made at the same time in relation to the random drive signal sequence. This requires that the same random sequence be used during the idle measurements and during the coin testing phases; this can readily be achieved by suitable choice of the random generator 22.) By using idle measurements in this way, it is possible to compensate the effects of the bridge being slightly unbalanced in the absence of a coin, for example due to the effects of temperature.

It is not essential to use a bridge which is unbalanced in the absence of a coin. For example, it may be desirable to arrange for the bridge to be balanced in the presence of a specific type of coin in order to improve sensitivity for that coin.

The measurements used by the processor 28 may all be derived while the coin is substantially at a predetermined location with respect to inductance L, for example, at the mid-point of the coin's travel past a coil forming the inductance L. The sample rate is sufficiently high (the clock 18 may for example have a frequency exceeding 1 MHz) that many measurements are taken before the coin has traveled a significant distance.

In alternative arrangements, the processor 28 uses measurements taken while the coin is travelling over a certain distance. For example, for each of a plurality of successive measurement intervals, the measurements obtained during that interval are used to derive a set of coefficients for the stored model. Accordingly, for each coefficient there will be a sequence of changing values correlated with the different transfer functions as the coin approaches and then leaves the inductance L. Acceptance criteria may be applied to all coefficient sequences. Preferably, a normalisation technique would be used to compensate for varying coin speeds. In other words, the above techniques can be used to derive sets of coefficients for different portions of the coin, as they pass the sensor, taking into account the position of the coin relative to the sensor. This can be useful, for example, in validating bi-colour coins, which have different materials for radially inner and outer regions. Similarly, functions of co-efficients evolving over time as the coin passes through the sensor can be derived. The coefficients can be used to derive other information, such as when the coin is centred over the sensor.

In the above described embodiment, the drive signal is a bipolar square wave with randomly-selected intervals between signal transitions. However, these features of the drive signal are not essential. It is preferred that the signal be bipolar in order to eliminate DC offset and thus reduce wasted energy, but this is not essential. It is preferred to take measurements during both states of the (binary) input signal, but this also is not essential.

It is preferred to use square waves of randomly-determined duration with a uniform sampling rate. However, the signal may take a different shape (e.g. triangular), so long as a sufficiently wide spectrum of frequencies is contained within the signal. If a square wave is used, it may adopt more than two amplitude levels. In any event, preferably the drive signal is a piecewise signal with randomly-selected intervals between transitions.

Instead of using a random sequence, it would be possible to use a fixed, predetermined sequence. However, the relationship between the drive signal sequence and the sampling time should be such as to exploit the wide frequency spectrum of the drive signal. Use of a drive signal with a wide frequency spectrum and sampling at a high rate provides a large number of measurements representative of the detailed coin structure throughout at least a significant proportion of the depth of the coin.

If a known sequence is used to form the drive signal, it may be possible for the sequence to form part of the model stored by the processor 28, thus eliminating the need for the model to receive the input signal from the generator 22.

In the above embodiment, the model had model orders p and q. For a Maxwell bridge, suitable values are p=2 and q=2.

In one embodiment, these values, which determine the number of coefficients calculated during the classification stage, are fixed. However, this is not essential. Instead, the model numbers can be varied in dependence on certain conditions. For example, assuming that the processor is arranged to check whether a coin belongs to one of a number of different target coin classes, the model orders may be varied in dependence on which target class is being checked. Alternatively or additionally, the processor 28 may perform a pre-classification based on, for example, the output of a different coin sensor or a preliminary analysis of the output of the inductance L, and then change the model orders p, q in dependence on this pre-classification process. In one particular example, the model orders may be increased if a pre-classification process indicates that there is likelihood that the coin being tested is a bicolour coin, to account for the more complex nature of the transfer function of the combined sensor and coil.

In other words, for a given coin sensor, one model may be used, or more than one model may used, and similarly any given model may vary. For example, the model structure, such as the orders p and q could evolve, and be changed as well.

In the embodiment, an example of a suitable transfer function and model has been given. It should be understood that to capture the coin and/or coil actual behaviour and eddy current effect a more complex model can be used for describing the system dynamic and structure.

The embodiment uses an inductive sensor. The described processing and modelling techniques can be applied to other types of sensors, such as capacitive and RF sensors, and the corresponding inputs/outputs.

As described above, coefficients from the models are used for validation/denomination. Instead of using the coefficients directly, other values derived from the coefficients can be used. For example, data derived from the corresponding frequency spectrum (digital or analog) can be used. In the frequency spectrum, a set, sub-set, or sub-band of frequencies, and the corresponding amplitudes, can be selected. Frequency information may be especially useful in the context of coin recognition, because frequency is related to depth of penetration within the coin of eddy currents. Coefficients, or other related data, such as frequency data, can be further processed, such as by averaging, before being applied to acceptance criteria.

The mapping of a digital model to a corresponding frequency spectrum involves known techniques, see, for example, An Introduction to the Analysis and Processing of Signals by Paul Lynn, 1973. The digital spectrum, takes the Z transform of the model and replaces Z by $E^{(i*2*pi*f*dt)}$, where dt is the sampling rate, i the imaginary number. Such a technique provides a periodic spectrum due to the aliasing. The analog spectrum uses the link between the Z transform and the Laplace transform of the model. It is well known that the s-tranform can be evaluated along the imaginary axis ($s=i*2*pi*f$) providing the Fourier transform.

An advantage of the related analog and digital system models, is that the filter coefficients can be used to derive an analog frequency spectrum, which avoids frequency aliasing problems in the digital model.

The modelization techniques as described above can be extended to a model having more then one input and/or more than one output. This is known as MIMO (multiple input multiple output). MIMO techniques are known and described, for example, in http://www.cheric.org/education/practical/mpc2-132-141.pdf, mentioned above.

Such techniques could be used, for example, for processing more then one sensor (such as coil) at the same time. For instance, a coin tester may include a small coil for material and thickness detection and a larger coil for diameter measurement. Since there is likely to be interference (cross-talk) between the sensors, a MIMO model (ARMAX, OE, etc) can be used to modelize the whole system including the cross link between sensors.

This is extendable to any number of sensor outputs and inputs, and the number of outputs and inputs may be different.

The invention has been described in the context of coin validators, but it is to be noted that the term "coin" is employed to mean any coin (whether valid or counterfeit), token, slug, washer, or other metallic object or item, and especially any metallic object or item which could be utilised by an individual in an attempt to operate a coin-operated device or system. A "valid coin" is considered to be an authentic coin, token, or the like, and especially an authentic coin of a monetary system or systems in which or with which a coin-operated device or system is intended to operate and of a denomination which such coin-operated device or system is intended selectively to receive and to treat as an item of value.

Other implementations are within the scope of the claims.

The invention claimed is:

1. A method of testing a coin using at least one coin sensor which operates in response to a respective drive signal and a processor storing a transfer function of the sensor(s) in the presence of a coin, the method comprising:
   driving the coin sensor(s) using at least one broadband signal as the drive signal(s) and deriving multiple measurement samples from the sensor(s) in the presence of a coin, wherein the measurement samples represent the effects of eddy currents in a coin under test and influenced by a field generated in response to the drive signal;
   deriving coefficients of the transfer function using the measurement samples; and
   applying acceptance criteria using the coefficients to determine whether the coin falls within a predetermined class of coins.

2. A method as claimed in claim 1, including the step of applying the drive signal(s) to the transfer function.

3. A method as claimed in claim 1, wherein at least one drive signal has at least one randomly-determined parameter.

4. A method as claimed in claim 3, wherein at least one drive signal is a piecewise signal with transitions at randomly-determined instants.

5. A method as claimed in claim 4, wherein at least one drive signal has substantially instantaneous voltage transitions at randomly-determined instants.

6. A method as claimed in claim 1, wherein the transfer function is represented by a time difference equation.

7. A method as claimed in claim 6 wherein the time difference equation is:

$$y[k] = \frac{1}{a_0}\left(\sum_{l=1}^{p} -a_l y[k-l] + \sum_{l=0}^{q} b_l x[k-l-m] + n[k]\right)$$

where k is a time-ordered index, $x[k]$ and $y[k]$ are the samples of the sensor input and output, respectively, $n[k]$ represents noise, p and q are predetermined model orders, m is a delay value and $a_0$, $a_1$ and $b_1$ are coefficients.

8. A method as claimed in claim 1 comprising using the coefficients to derive a frequency spectrum, and applying acceptance criteria using values of the frequency spectrum to determine whether the coin falls within a predetermined class of coins.

9. A method as claimed in claim 1 wherein the sensor comprises a combined transmit/receive coil.

10. A coin sensor comprising:
    a combined transmit/receive inductor located in proximity to a coin path;
    a drive circuit arranged to drive the inductor with a broadband signal;
    a sampler coupled to the inductor for deriving successive measurement samples having values influenced by the times of the samples relative to the drive signal as a result of eddy currents induced in a coin by the field generated by the inductor; and
    a processor responsive to the measurement samples to derive coefficients of a transfer function of the inductor in the presence of the coin and to determine whether the coin meets acceptance criteria representing a coin of a particular class;
    wherein the inductor is located in an arm of an A.C. bridge circuit having an input for receiving said drive signal and an output from which said measurement samples are derived.

11. A coin sensor as claimed in claim 10, wherein the drive signal is a piecewise signal.

12. A coin sensor as claimed in claim 11, wherein the drive signal has substantially instantaneous voltage transitions.

13. A coin sensor as claimed in claim 12, wherein the drive signal is a square wave.

14. A coin sensor as claimed in claim 10, wherein the bridge circuit is a Maxwell bridge.

15. A coin sensor as claimed in claim 10, wherein the bridge circuit is substantially balanced in the absence of a coin.

16. A coin sensor as claimed in claim 10, wherein the processor is arranged to derive the difference between each measurement sample and an idle sample which was derived in the absence of a coin and at a timing relative to the drive signal which corresponds to the timing of the respective measurement sample.

17. The apparatus of claim 10 wherein the inductor is a single combined transmit/receive coil.

18. A method as claimed in claim 1, using a coin sensor according to claim 10.

19. Apparatus comprising a processor arranged to operate according to a method as claimed in claim 1 or claim 18.

* * * * *